Figure 1:
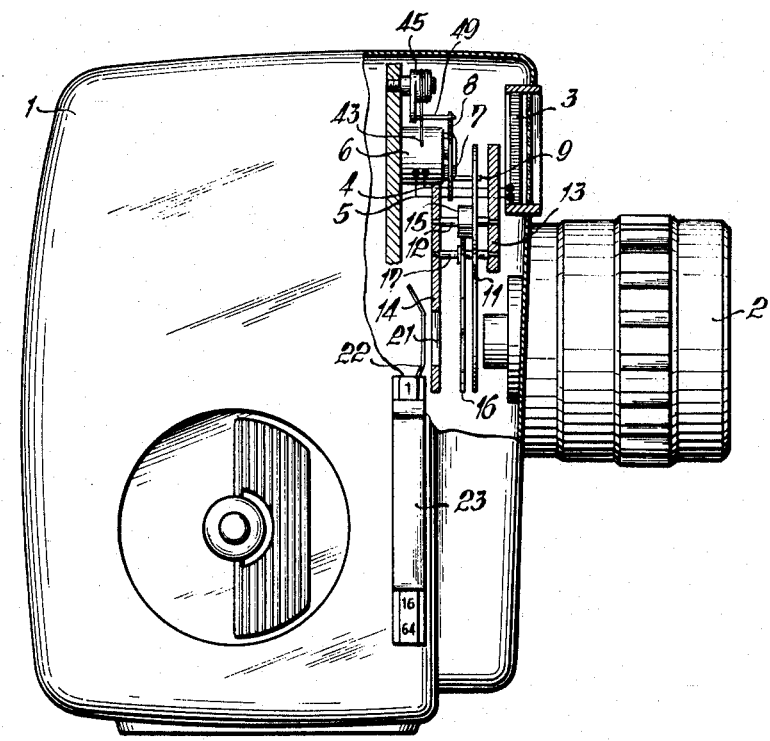

July 19, 1966  H. REINSCH  3,261,653
MOTION PICTURE CAMERA WITH AUTOMATIC EXPOSURE CONTROL
Filed Nov. 5, 1963  2 Sheets-Sheet 1

INVENTOR
Herbert Reinsch
by Michael J. Striker
Atty

July 19, 1966  H. REINSCH  3,261,653
MOTION PICTURE CAMERA WITH AUTOMATIC EXPOSURE CONTROL
Filed Nov. 5, 1963  2 Sheets-Sheet 2

INVENTOR
Herbert Reinsch
by
Michael J. Striker
Atty

United States Patent Office 3,261,653
Patented July 19, 1966

3,261,653
MOTION PICTURE CAMERA WITH AUTOMATIC EXPOSURE CONTROL
Herbert Reinsch, Stuttgart, Germany, assignor to Eugen Bauer G.m.b.H., Stuttgart-Unterturkheim, Germany
Filed Nov. 5, 1963, Ser. No. 321,509
Claims priority, application Germany, Nov. 7, 1962, B 69,534
18 Claims. (Cl. 352—141)

The present invention relates to motion picture cameras and in particular to motion picture cameras which have devices for automatically setting the exposure aperture according to the lighting conditions as well as an adjustment for changing the number of frames of film which are exposed per second.

Motion picture cameras are provided with adjustments for changing the number of frames of film which are exposed per second so that it is possible to speed up or slow down the motion of the subject. Of course, where such a camera has automatic setting of the exposure aperture according to the lighting conditions, it is necessary when changing the number of film frames which are exposed per second to change the setting of the aperture so that the film will be properly exposed when transported at a different number of frames per second. Thus, the exposure time of the film of a motion picture camera is determined by the number of film frames which are exposed per second, and since the lighting conditions do not change with the change in the number of film frames exposed per second it is necessary to adapt the exposure aperture to the number of film frames which are exposed per second, and in this way it is possible to properly expose the film at different speeds of film movement.

While it is possible to change the setting of the exposure aperture with cameras of this type when changing the speed of movement of the film either by changing the resistance of the electrical circuit of the light-measuring structure or by connecting into the moving coil of the galvanometer of such a circuit an additional winding which is provided with energy from a generator in a manner dependent upon the number of frames of film exposed per second, these solutions are not satisfactory. The reason for this is that in both cases the normal damping of the movement of the moving coil prevents the aperture from being adapted to the new number of film frames exposed per second with the required rapidity. Thus, it is well known that galvanometers are delicate instruments and the free turning of the moving coil of a galvanometer is damped so that it will swing slowly in response to changing lighting conditions, and because of this damping it is impossible under the above conditions for the electrical structure to change the setting of the diaphragm in the same relatively short time that it is possible for the operator to change the speed of movement of the film. Thus, if the operator is operating the camera with a given number of film frames exposed per second and without any substantial interruption in the photographing of a given subject changes to a different number of film frames exposed per second, the new speed of movement of the film will be produced in a far shorter time than it is possible for the automatic structure to respond so as to provide an aperture adapted to the new speed of movement of the film because of the necessary damping of the swinging of the moving coil of the galvanometer. If the damping were to be made much smaller than usual then the result would simply be that the system would overswing and a relatively long time would be required until the galvanometer placed the diaphragm in a position providing the proper aperture for the changed number of frames exposed per second, and such a result is as undesirable as the relatively strong damping of the moving coil which also results in a change of the aperture which is too slow. In both of these cases there will be, during projection of the developed film, a very noticeable over or under exposure of the film. This over or under exposure of the film will be quite noticeable during the change-over period from one speed of movement of the film to a period where the action has either been speeded up or slowed down.

It is accordingly a primary object of the present invention to provide a camera of the above type which will avoid the above drawbacks by making it possible to adapt the aperture of the camera to the different number of film frames exposed per second in the same time period that it takes to change the number of film frames exposed per second.

It is furthermore an object of the present invention to provide a structure which will accomplish this result by adjusting a movable part of the light-measuring structure.

A further object of the present invention is to provide a structure where the adjustment of the movable part of the light-measuring system is brought about in a fully automatic manner whenever the operator changes the number of film frames exposed per second.

Still another object of the present invention is to provide a structure where even though parts of the light-measuring system are positively moved, in order to change the exposure aperture to adapt it to a new number of film frames exposed per second, nevertheless the adjustment of the light-measuring system is carried out in a gradual, gentle manner which will prevent any damage to the delicate light-measuring structure which might result if parts of this structure were very suddenly moved.

It is furthermore an object of the present invention to provide a structure of the above type where the light-measuring system is capable of operating to measure the light and set the diaphragm when the camera is not operating or when it is operating at a given number of film frames per second and where the adapting of the aperture to the new number of film frames exposed per second can be carried out irrespective of the particular aperture which happens to be set at any given instant in response to the lighting conditions so that starting from an aperture which is suitable for exposure of the film at a given number of frames per second with the lighting conditions which happen to prevail at a given instant the structure of the invention will change this particular setting of the diaphragm by a given increment so as to provide in this way a new diaphragm setting which is adapted to the different number of film frames exposed per second.

Yet another object of the present invention is to provide a structure of the above type which is simple, compact, and at the same time very reliable in operation.

With these objects in view the invention includes, in a motion picture camera, a diaphragm means for determining the exposure aperture through which film in the camera is exposed, and an automatic means which responds to the lighting conditions and is operatively connected to the diaphragm means for setting the latter to provide a proper exposure aperture according to the lighting conditions. The camera also includes a manually operable means for changing the rate at which film in the camera is exposed from a given number of frames per second to a second number of frames per second, and in accordance with the present invention a motion transmitting means is operatively connected to the manually operable means and moves into engagement with the automatic means when the manually operable means is actuated to change the speed of movement of the film from the given number of frames per second to the second number of frames per second, for actuating the automatic means at this time to reset the aperture of the diaphragm means to one which is adapted to the second number of film frames exposed per second.

Figure 2:
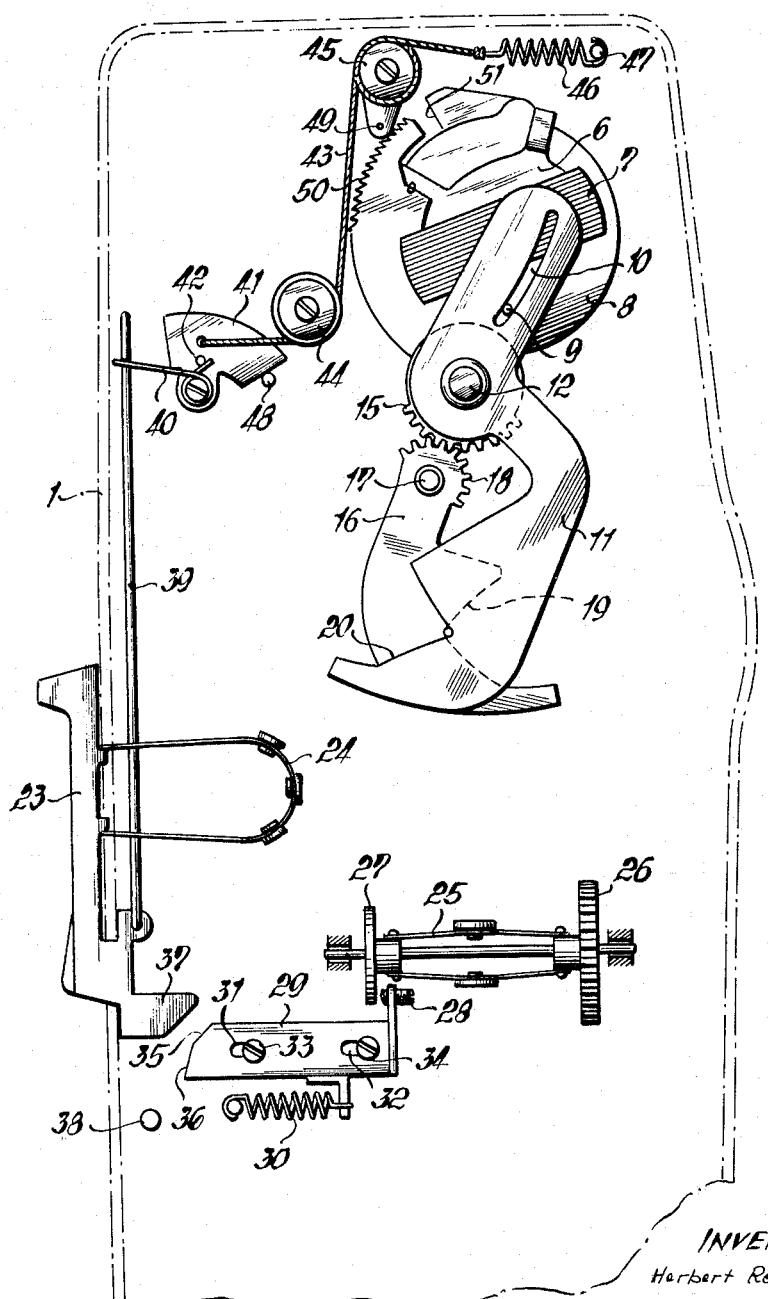

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional and partly schematic side view of a motion picture camera according to the present invention, the parts which are shown in section in FIG. 1 being those parts which form part of the structure of the invention; and FIG. 2 is an enlarged view, as compared to FIG. 1, taken in a plane perpendicular to the plane of FIG. 1, and showing, also in part schematically, the structure of the invention according to one possible embodiment thereof.

Referring now to the drawings, it will be seen that the housing 1 of the motion picture camera is provided in a conventional manner with the objective 2 and the photocell 3 which of course responds to the lighting conditions. The current which is generated by light which impinges on the photocell is delivered through the conductors 4 and 5 (FIG. 1) to the light-measuring instrument formed by the galvanometer 6. This galvanometer includes a moving coil 7 which freely turns around the axis of the galvanometer housing and which assumes angular positions determined by the lighting conditions, as is well known in the art. The moving coil assembly includes in addition to the moving coil per se 7 a plate 8 which is of an arcuate configuration and which is fixed to the moving coil 7 for turning movement therewith, so that the plate 8 forms part of the moving coil assembly of the automatic, light-measuring structure and turns with the moving coil assembly.

As is particularly apparent from FIG. 2, the plate 8, in the illustrated example, carries a pin 9 which extends into an elongated slot 10 formed in a diaphragm blade 11 which is fixedly carried by a pivot pin 12 which extends through the blade 11, and, as is particularly apparent from FIG. 1, the ends of the pin 12, which are of reduced size, are received in the openings of a pair of stationary supporting plates 13 and 14 of the camera, so that these plates form bearings for the pin 12, and in this way it is possible for the blade 11 to turn in response to turning of the moving coil assembly 7, 8. The pin 12 fixedly carries, in addition to the blade 11, a gear sector 15 which meshes with a gear sector 18 which is formed at one end of a second diaphragm blade 16 which is fixedly carried by a pivot pin 17 which also extends between and is supported for turning movement by the plates 13 and 14. Thus, the turning of the blade 11 in one direction will result in equal and opposite turning of the blade 16, and the blades 11 and 16 are respectively formed with the substantially wedge-shaped notches 19 and 20 so that when the blades turn the extent to which they overlap each other will change and thus the aperture provided by the notches 19 and 20 will change in a manner well known in the art, and this aperture will of course at all times have its center coinciding with the optical axis. As may be seen from FIG. 1, the film gate 21 through which the film is exposed is located behind the diaphragm blades and is in the form of an opening which is formed in the stationary plate 14, and behind this film gate 21 is located the film 22 which is to be exposed. Thus, it will be seen that the above-described structure forms a diaphragm means 11, 16 which provides the exposure aperture through which the film is exposed, and in addition the above-described structure includes an automatic means which responds automatically to the lighting conditions and which is operatively connected to the diaphragm means for automatically setting the latter to provide an exposure aperture according to the lighting conditions.

A manually operable means is provided not only for starting and stopping the camera but also for determining the number of film frames which are exposed per second, and this manually operable means includes the shiftable, manually-engageable element 23 which is accessible to the operator at a side wall of the camera. Thus, the operator will move the shiftable member 23 downwardly from the position shown in FIG. 2 in order to start the operation of the camera as well as in order to determine the number of film frames exposed per second. A spring 24 coacts with the manually shiftable element 23 for yieldably maintaining it in the position illustrated in FIG. 2 where the camera is not operating, and this spring 24 takes the form of an elongated leaf spring which is curved as shown in FIG. 2 and which has free ends cooperating with a projecting portion of the shiftable element 23 for yieldably maintaining the latter in the position illustrated in FIG. 2. Whenever the operator releases the element 23 the spring 24 will automatically return it to the position illustrated in FIG. 2, and during operation of the camera the operator will hold the element 23 in a given position which will provide a corresponding speed of movement of the film.

In order to control the number of frames exposed per second the camera includes a governor 25 which is a conventional centrifugal governor which is coupled to the driving motor of the camera in a manner well known in the art. A gear 26 serves to transmit the drive from the motor to the unillustrated film-transporting structure which forms no part of the invention and which is therefore not illustrated or described. A brake disk 27 of the governor means 25 is constrained to rotate with the gear 26, and depending upon the speed of rotation of the gear 26 the brake disc 27 will be located at a given axial distance from the gear 26, as is well known with centrifugal governors of the type shown diagrammatically in FIG. 2. Thus, the shaft which carries the gear 26 supports the brake disc 27 for axial shifting movement and the brake disc 27 is connected to the gear 26 for rotary movement therewith through any suitable devices such as linkages composed of pivotally interconnected levers or leaf springs which carry weights which depending upon the speed of rotation of the gear 26 will centrifugally move away from the axis of the gear 26 to draw the brake disc 27 closer to the gear 26 as the speed of rotation thereof increases, as is well known. The structure for determining the speed of movement of the film also includes a brake pin 28 which is in the form of a screw threadedly carried by a lug of a shiftable plate 29 formed with a pair of elongated slots 31 and 32 through which the stationary pins 33 and 34 extend so that in this way the plate 29 can shift to the right and left, as viewed in FIG. 2, and a spring 30 is operatively connected to the plate 29 for urging the latter to the left, as viewed in FIG. 2, to the illustrated rest position determined by the cooperation of the right ends of the slots 31 and 32 with the pins 33 and 34, respectively. The left edge of the plate 29, as viewed in FIG. 2, is provided with a pair of edge portions 35 and 36 which have different inclinations as shown in FIG. 2 and which respectively cooperate with the projection 37 of the manually shiftable element 23. Thus, the element 23 when moved downwardly by the operator will have its projection 37 cooperating first with the inclined edge portion 35 and then with the inclined edge portion 36 so as to determine the axial position of the member 29 and thus the axial position of the brake pin 28 which by cooperation with the brake disc 27 will determine the number of frames exposed per second and thus the elements 23 and 29 form the manually operable means for determining the number of frames exposed per second. The camera includes a stationary pin 38 located in the path of downward movement of the element 23 so as to limit the downward movement thereof.

In addition to the above-described manually operable means for determining the number of frames exposed per second, the structure includes a motion-transmitting means which is operatively connected to the manually operable means and which moves into engagement with the moving coil assembly 7, 8 to turn the latter automatically to a position providing through the diaphragm means an aperture adapted to a changed number of film frames exposed per second. This motion-transmitting means includes an elongated hook member 39 connected at its bottom end, as viewed in FIG. 2, to the shiftable member 23 and having at its top end a hook portion which extends over a free end of a wire spring 40. The hook member 39 of the motion transmitting means is guided for vertical movement through any suitable guiding structure, and of course the same is true of the vertically shiftable element 23. The wire spring 40 is coiled about a stationary pivot pin which supports a mass 41 for free swinging movement, and this wire spring 40 has at its end distant from the elongated portion over which the hook end of the hook member 39 extends a portion engaging a pin 42 which is carried by the swingable mass 41. The elongated free end portion which extends beneath the hook end of the member 39 is held in the position shown in FIG. 2 by a projecting portion of the mass 41 beneath which this elongated free end portion of the spring 40 extends, and it is therefore apparent that when the hook member 39 moves downwardly it will engage an end of the spring 40 and will tend to turn the mass 41 in a counterclockwise direction, as viewed in FIG. 2, and of course before the mass 41 will turn in this way it will be necessary for the inertia thereof to be overcome. In the illustrated position the mass 41 engages a stop member 48 in the form of a stationary pin carried by a stationary wall of the camera.

The motion-transmitting means further includes a cable-and-pulley assembly which includes the flexible cable 43 one end of which is fixed to the mass 41 and the other end of which is fixed to a spring 46 which is in turn carried by a stationary pin 47 so that the spring 46 tends to pull the upper portion of the cable 43 of FIG. 2 to the right, as viewed in FIG. 2. The cable 43 passes around a pulley 44 which is supported for free turning movement by any suitable stationary pin and then around a second pulley 45 which is also supported for turning movement by any suitable stationary pin, and then the free end of the cable 43 is fixed to the spring 46 as illustrated in FIG. 2. Thus, it will be seen that the cable-and-pulley assembly acts on the mass 41 to urge it into engagement with the stop 48.

The motion-transmitting means includes a lever which is fixed to the pulley 45 for turning movement therewith, this lever extending downwardly from the pulley 45, as shown in FIG. 2, and the lever in turn fixedly carries an elongated springy element 49 which is in the form of a springy wire and which extends normal to the plane of FIG. 2 across the edge of the plate 8 of the moving coil assembly. As is apparent from FIG. 2 the plate 8 is formed at its edge portion across which the springy element 49 extends with a series of teeth 50, and when the mass 41 turns away from the stop 48 the springy element 49 will turn into engagement with one of the teeth 50 and will turn the moving coil assembly in a clockwise direction, as viewed in FIG. 2.

The housing of the galvanometer 6 fixedly carries a stationary stop member or is simply provided with a stationary edge portion 51 which forms a stop member, this stop 51 being located in the path of turning of the springy element 49 so as to limit the extent to which the plate 8 is turned.

When the operator wishes to run the camera so as to photograph a given subject, the operator will simply depress the shiftable member 23 of the manually operable means in opposition to the spring 24 until the projection 37 engages the inclined edge portion 35 of the shiftable plate 29. Inasmuch as the member 23 also serves to start the operation of the camera, this movement will result in a well known manner in the starting of the operation of the camera and the film will be transported and exposure will be made as a result of this downward movement of the member 23 by the operator. The brake disc 27 of the governor means 25 cooperates with the screw 28 in a known way to provide a uniform speed of movement of the film so that a given number of film frames will be exposed per second. The light-measuring structure is designed to provide proper exposure apertures when the camera is operating at this given number of film frames per second, which is to say at the number of film frames per second provided by the plate 29 when it is in the position illustrated in FIG. 2 and where the projection 37 engages only the edge portion 35 but has not shifted the plate 29 to the right, as viewed in FIG. 2. It will be noted that at this time the pin or springy element 49 is spaced from the plate 8 and that the light-measuring structure operates in a free way which is in no way influenced by the motion-transmitting means. Thus, at this time a given number of film frames will be exposed per second and the light-measuring structure will automatically set the diaphragm to apertures adapted to this given number of film frames per second and to the lighting conditions. At this time the upper, hook end of the hook member 39 has not yet engaged the spring 40. It has, however, approached closer to the spring 40 as a result of the movement of the projection 37 into engagement with the edge 35 of the plate 29. Thus, it will be seen that the structure of the invention does not in any way interfere with the setting of the diaphragm by the light-measuring structure even when the camera is not operating or when it is operating at the given number of film frames per second determined by the simple downward movement of the element 23 into engagement with the edge 35 of the plate 29.

Assuming that it is desired to operate the camera at a different number of frames per second which in the illustrated example will be a greater number of frames per second, then the operator will move the element 23 down into engagement with the stop 38 in opposition not only to the spring 24 but also to the spring 30, and thus the projection 37 will shift downwardly from the edge portion 35 into engagement with the edge portion 36 so as to shift the element 29 to the right and displace the pin 28 to the right from the brake disc 27. Thus, it will be possible for the gear 26 to rotate at a higher speed until the brake disc 27 is shifted into engagement with the pin 28, and in this way the governor means will serve to operate the camera at a larger number of frames exposed per second.

Simultaneously with the downward movement of the member 23 to provide the greater number of film frames exposed per second, the upper, hook end of the member 39 has engaged the spring 40 and has turned the left free end thereof, as viewed in FIG. 2, downwardly. This spring 40 will therefore turn the mass 41 away from the pin 48 after the force of the spring 40 has overcome the inertia of the mass 41, and in this way the mass 41 will pull the cable 43 in opposition to the spring 46 for turning the pulley 45 and thus the lever connected thereto and the springy element 49 which now moves into engagement with the teeth 50 of the plate 8 and turns the latter together with the rest of the moving coil assembly until the springy element 49 engages the stop 51, and in this way the aperture will be adapted to the new number of frames exposed per second. In the illustrated example inasmuch as the film is moving at a larger number of frames per second the exposure time has been reduced and it thus becomes necessary to provide a larger aperture. Thus, before the plate 8 has been turned by cooperation of element 49 with the teeth 50 this plate 8 was in an angular position determined by the lighting conditions and the aperture provided by the diaphragm was determined by the lighting conditions, and with the structure of the invention the increment of turning determined by the position of the stop 51 will change the aperture determined by the lighting conditions to an aperture which is adapted to the new number of frames exposed per second, and the aperture will be maintained in its reset position as long as the operator maintains the element 23 depressed in engagement with the pin 38.

The force of the spring 40 is chosen in such a way that the movement of the mass 41 which is under the influence of the spring 46 through the cable-and-pulley assembly will take place as a result of the inertia of the mass 41 at a delayed rate which is precisely equal to the rate at which the governor 25 is capable of changing the speed of movement of the film to the new speed, so that the new diaphragm setting will be provided in the same time period as the new speed of film movement. Moreover, in addition to acting on the moving coil assembly to change the diaphragm setting in the same time period that the governor changes the speed of movement of the film, the motion transmitting means of the invention acts in a gentle, impact-free manner on the moving coil assembly so that the delicate light-measuring structure is in no way injured as indeed it might be if it were very suddenly moved with a structure which provided a direct drive from the pulley 45 to the plate 8. The yieldability of the springy element 49 protects the moving coil assembly. The element 51 may be in the form of an adjustable stop member so that in this way it is possible to adjust the extent to which the diaphragm is changed when the speed of movement of the film is changed.

Assuming that the operator now releases the shiftable member 23, the spring 24 will return it upwardly to its rest position so that the projection 37 slides upwardly along the inclined edge portion 36 of element 29, and thus the spring 30 will return the member 29 to its original position shown in FIG. 2, and of course the governor 25 will also be returned to its original position providing the original number of film frames exposed per second. Of course, the operator can sense when the projection 37 is again in engagement with the edge portion 35 of the element 29, through the feel of the shiftable member 23, and in this way the number of film frames exposed per second can be returned back to the original number of frames exposed per second resulting from the simple starting of the camera.

When the operator fully releases the member 23 the spring 24 will return it to its rest position and the camera will of course stop operating.

During the upward movement of the element 23 to the extent required to place the projection 37 in engagement with the edge portion 35, the upper, hook end of the hook member 39 has moved upwardly away from the spring 40, so that the spring 46 can now act to return the mass 41 into engagement with the projection 48 and of course the springy element 49 will move out of engagement with the teeth 50. When the springy element 49 moves away from the teeth 50 the moving coil assembly will be released for free movement to the position determined by the lighting conditions and of course this position will provide an aperture adapted to the number of frames exposed per second when the element 29 is in the position shown in FIG. 2.

It will be understood that each of the elements described above, or two or more together, may also find a useful application in other types of cameras differing from the types described above.

While the invention has been illustrated and described as embodied in motion picture cameras, it is not intended to be limited to the details shown, since various modifications and structural changes may be made without departing in any way from the spirit of the present invention as defined in the claims.

Without further analysis, the foregoing will so fully reveal the gist of the present invention that others can by applying current knowledge readily adapt it for various applications without omitting features which fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture camera, in combination, diaphragm means providing an exposure aperture through which film in the camera is exposed; automatic means operatively connected to said diaphragm means for automatically adjusting the latter according to the lighting conditions to provide an exposure aperture which will give proper exposure when the film in the camera is exposed at a given number of frames per second; manually operable means for changing the number of frames exposed per second from said given number to a second number of frames per second; and motion-transmitting means connecting said manually operable means to said automatic means when said manually operable means changes the number of frames exposed per second from said given number for transmitting to said automatic means movement of said manually operable means to said second number for moving said automatic means to a position where the diaphragm means will provide an aperture which will give proper exposure of the film when the latter is exposed at said second number of frames per second.

2. In a motion picture camera, in combination, diaphragm means for providing an exposure aperture through which film in the camera is exposed; automatic means operatively connected to said diaphragm means for automatically adjusting the latter according to the lighting conditions to provide an exposure aperture which will properly expose film in the camera according to the lighting conditions when the film in the camera is exposed at a given number of frames per second, said automatic means including an electrical instrument which has a moving coil assembly; manually operable means for changing the rate at which film in the camera is exposed from said given number of frames per second to a second number of frames per second; and motion-transmitting means connecting said manually operable means to said moving coil assembly of said automatic means for turning said moving coil assembly when said manually operable means is actuated to change the number of frames exposed per second from said given number to said second number for changing the adjustment of the diaphragm means to one where the exposure aperture will properly expose the film during exposure thereof at said second number of frames per second.

3. In a motion picture camera, in combination, diaphragm means for providing an exposure aperture through which film in the camera is exposed; automatic means operatively connected to said diaphragm means for automatically adjusting the latter according to the lighting conditions to provide an exposure aperture which will properly expose film in the camera according to the lighting conditions when the film in the camera is exposed at a given number of frames per second, said automatic means including an electrical instrument which has a moving coil assembly; manually operable means for changing the rate at which film in the camera is exposed from said given number of frames per second to a second number of frames per second; and motion-transmitting means connecting said manually operable means to said moving coil assembly of said automatic means for turning said moving coil assembly when said manually operable means is actuated to change the number of frames exposed per second from said given number to said second number for changing the adjustment of the diaphragm means to one where the exposure aperture will properly expose the film during exposure thereof at said second number of frames per second, said motion-transmitting means remaining out of engagement with said moving coil assembly until said manually operable means is actuated to change the number of frames exposed per second from said given number to said second number.

4. In a motion picture camera, in combination, diaphragm means for providing an exposure aperture through which film in the camera is exposed; automatic means operatively connected to said diaphragm means for automatically adjusting the latter to provide a proper exposure aperture according to the lighting conditions when film in the camera is exposed at a given number of frames per second, said automatic means including a turnable moving coil assembly which includes a plate which turns with the assembly and which has an edge portion formed with teeth; manually operable means for changing the rate at which film in the camera is exposed from said given number of frames per second to a second number of frames per second; and motion transmitting means connecting said manually operable means to said automatic means when said manually operable means is actuated to change the number of frames exposed per second from said given number to said second number, said motion-transmitting means including a springy, elastic element which moves into engagement with said teeth of said plate to turn the latter and said moving coil assembly for actuating said automatic means to provide a diaphragm adjustment which will give a proper exposure aperture during exposure of film at said second number of frames per second.

5. In a motion picture camera, in combination, diaphragm means for providing an exposure aperture through which film in the camera is exposed; automatic means operatively connected to said diaphragm means for automatically adjusting the latter to provide a proper exposure aperture according to the lighting conditions when film in the camera is exposed at a given number of frames per second, said automatic means including a turnable moving coil assembly which includes a plate which turns with the assembly and which has an edge portion formed with teeth; manually operable means for changing the rate at which film in the camera is exposed from said given number of frames per second to a second number of frames per second; and motion transmitting means connecting said manually operable means to said automatic means when said manually operable means is actuated to change the number of frames exposed per second from said given number to said second number, said motion-transmitting means including a springy, elastic element which moves into engagement with said teeth of said plate to turn the latter and said moving coil assembly for actuating said automatic means to provide a diaphragm adjustment which will give a proper exposure aperture during exposure of film at said second number of frames per second, said springy element of said motion transmitting means being spaced from and out of engagement with said teeth when the camera is not operating as well as when the camera provides exposure of film at said given number of frames per second.

6. In a motion picture camera, in combination, diaphragm means providing an exposure aperture through which film in the camera is exposed; automatic means operatively connected to said diaphragm means for automatically adjusting the latter to provide a proper exposure aperture according to the lighting condition when film in the camera is exposed at a given number of frames per second, said automatic means including a turnable moving coil assembly which includes a plate which turns with the assembly and which has an edge portion formed with teeth; manually operable means for changing the number of frames of film exposed per second from said given number to a second number; motion-transmitting means transmitting movement of said manually operable means to said automatic means when said manually operable means is actuated to change the number of frames exposed per second from said given number to said second number, said motion-transmitting means including a springy element which moves into engagement with said teeth and turns said plate and moving coil assembly upon actuation of said manually operable means to provide exposure of film at said second number of frames per second; and stop means located in the path of movement of said springy element for limiting the movement thereof and thus limiting the extent to which said moving coil assembly is turned, the position of said stop means cooperating with said springy element and moving coil assembly to change the adjustment of said diaphragm means to one where the exposure aperture will be proper for exposure of the film at said second number of frames per second.

7. In a motion picture camera, in combination, diaphragm means for providing an exposure aperture through which film in the camera is exposed; automatic means operatively connected to said diaphragm means for adjusting the latter to provide an exposure aperture according to the lighting conditions which is proper when film in the camera is exposed at a given number of frames per second, said automatic means including a moving coil assembly; manually operable means for changing the number of frames of film exposed per second from said given number to a second number; and motion-transmitting means transmitting motion of said manually operable means to said moving coil assembly when said manually operable means is actuated to change the number of frames of film exposed per second from said given number to said second number for automatically actuating said automatic means to adjust said diaphragm means to provide an exposure aperture which is proper when film is exposed at said second number of frames per second, said motion-transmitting means including a cable-and-pulley assembly which is actuated to initiate the movement of said moving coil assembly.

8. In a motion picture camera as recited in claim 7, said moving coil assembly including a plate which turns with said assembly and which has an edge portion formed with teeth and said motion-transmitting means including a pulley of said cable-and-pulley assembly which turns during actuation of said manually operable means to provide film exposure at said second number of frames per second, said motion-transmitting means further including a lever fixed to said pulley for turning movement therewith and an elongated springy element carried by said lever and turning into engagement with said teeth of said plate for turning the latter and said moving coil assembly therewith.

9. In a motion picture camera, in combination, diaphragm means for providing an exposure aperture through which film in the camera is exposed; automatic means operatively connected to said diaphragm means for automatically adjusting the latter according to the lighting conditions to provide an exposure aperture which is proper when film in the camera is exposed at a given number of frames per second, said automatic means including a turnable moving coil assembly; manually operable means for changing the number of frames of film exposed per second from said given number to a second number; and motion-transmitting means connecting said manually operable means to said automatic means only when said manually operable means is actuated to change the number of frames exposed per second from said given number to said second number for acting through said automatic means on said diaphragm means to adjust the latter to provide an exposure aperture which is proper for the film when the latter is exposed at said second number of frames per second, said motion-transmitting means including a cable-and-pulley assembly which when actuated transmits movement to said moving coil assembly, and said cable-and-pulley assembly including an elongated cable having a pair of free ends, said motion-transmitting means including a spring connected to one of said free ends of said cable and a freely-swingable mass connected to the other end of said cable.

10. In a motion picture camera, in combination, diaphragm means for providing an exposure aperture through which film in the camera is exposed; automatic means operatively connected to said diaphragm means for automatically adjusting the latter according to the lighting conditions to provide an exposure aperture which is proper when film in the camera is exposed at a given number of frames per second; manually operable means for changing the rate at which film in the camera is exposed from said given number of frames per second to a second number of frames per second, and the change in the rate of exposure of the film from said given number to said second number of frames per second requiring a predetermined increment of time; and motion-transmitting means operatively connected to said manually operable means and moving into engagement with said automatic means when said manually operable means is actuated to change the number of frames of film exposed per second from said given number to said second number for moving said automatic means to place said diaphragm means in a position providing an exposure aperture which will provide proper exposure of the film when the latter is exposed at said second number of frames per second, said motion-transmitting means acting on said automatic means to place the latter in a posiion where said diaphragm means has its newly-adjusted position in a length of time substantially equal to said increment of time so that when the change in the rate of exposure of the film has been carried out the adjustment of said diaphragm means will also have been carried out.

11. In a motion picture camera, in combination, diaphragm means providing an exposure aperture through which film in the camera is exposed; automatic means operatively connected to said diaphragm means for automatically adjusting the latter according to the lighting conditions to provide an exposure aperture which is proper for exposing film in the camera when the film is exposed at a given number of frames per second; governor means adjustable between at least two positions in one of which said governor means controls the camera to provide exposure of film at said given number of frames per second and in the other of which said governor means will control the camera to expose film therein at a second number of frames per second; manually operable means actuating said governor means to place the latter in a selected one of said positions; and motion-transmitting means transmitting motion of said manually operable means to said automatic means only when said manually operable means is actuated to change the rate of film exposure from said given number of frames per second to said second number of frames per second to actuate said automatic means for placing said diaphragm means in a position where the exposure aperture will be proper for exposure of the film at said second number of frames per second, said motion-transmitting means acting through said automatic means on said diaphragm means to place the latter in an adjusted position proper for exposure of film at said second number of frames per second in a length of time which substantially equals the length of time required for said governor means to change from the position of providing exposure of film at said given number of frames per second to the position providing exposure of film at said second number of frames per second.

12. In a motion picture camera, in combination, diaphragm means providing an exposure aperture through which film in the camera is exposed; automatic means operatively connected to said diaphragm means for adjusting the latter to provide an exposure aperture which is proper according to the lighting conditions when film in the camera is exposed at a given number of frames per second, said automatic means including a turnable moving coil assembly which includes a plate which turns with said assembly and which is formed at an edge portion with teeth; manually operable means for changing the number of frames of film exposed per second from said given number to a second number, said manually operable means including a shiftable element which is linearly shifted by the operator to change the rate of film exposure; an elongated hook member operatively connected to said shiftable element for shifting movement therewith and having a projecting hook portion; a rotary freely-swingable mass carried by the camera adjacent to said hook portion; a spring connected to said mass for turning movement therewith and having a free end located in the path of movement of said hook portion when said shiftable element is shifted by the operator to change the rate of film exposure from said given number to said second number of frames per second, so that said hook portion will then engage said spring to urge said freely swingable mass to turn when the inertia thereof is overcome; a cable-and-pulley assembly including a cable having one end connected to said mass; a second spring connected to the other end of said cable and acting through said cable-and-pulley assembly on said mass for urging the latter to a given rest position from which said mass is turned in response to engagement of said spring connected to said mass by said hook portion during shifting of said shiftable element; a lever fixed to a pulley of said cable-and-pulley assembly for turning movement therewith; and an elongated springy element fixed to said lever for turning movement therewith and turning into engagement with said teeth of said plate for turning said plate and said moving coil assembly therewith when said shiftable element of said manually operable means is linearly shifted by the operator to provide exposure of film at said second number of frames per second, whereby the turning of said plate will actuate said automatic means to provide through said diaphragm means an exposure aperture which is proper for exposure of the film at said second number of frames per second.

13. In a motion picture camera as recited in claim 12 stop means located in the path of movement of said springy element for stopping the latter at a position providing an exposure aperture proper for exposure of the film at said second number of frames per second.

14. In a motion picture camera as recited in claim 12 said springy element remaining out of engagement with said plate and said hook portion of said hook member remaining out of engagement with said spring of said mass when the camera is not operating and when the camera operates to expose film at said given number of frames per second, so that said springy element only acts on said plate when said shiftable member is actuated to provide exposure of film at said second number of frames per second.

15. In a camera as recited in claim 12 governor means actuated by said shiftable element for changing the number of frames of film exposed per second from said given number to said second number.

16. In a camera as recited in claim 15 said cable-and-pulley assembly together with said mass and said springs when actuated by said hook member co-operating with said plate to act on said automatic means for changing the adjustment of the diaphragm substantially in the length of time required for said governor means to change the speed of operation from one where the film is exposed at said given number of frames per second to one where the film is exposed at said second number of frames per second.

17. In a motion picture camera, in combination, diaphragm means providing an exposure aperture through which film in the camera is exposed; automatic means operatively connected to said diaphragm means for automatically adjusting the latter according to the lighting conditions to provide an exposure aperture which will give proper exposure when the film in the camera is exposed at a given number of frames per second; manually operable means for changing the number of frames exposed per second from said given number to a second number of frames per second; and mechanical motion-transmitting means connecting said manually operable means to said automatic means when said manually operable means changes the number of frames exposed per second from said given number to said second number for transmitting to said automatic means movement of said manually operable means for moving said automatic means to a position where the diaphragm means will provide an aperture which will give proper exposure of the film when the latter is exposed at said second number of frames per second.

18. In a motion picture camera, in combination, diaphragm means for providing an exposure aperture through which film in the camera is exposed; automatic means operatively connected to said diaphragm means for automatically adjusting the latter according to the lighting conditions to provide an exposure aperture which will properly expose film in the camera according to the lighting conditions when the film in the camera is exposed at a given number of frames per second, said automatic means including an electrical instrument which includes a moving member; manually operable means for changing the rate at which film in the camera is exposed from said given number of frames per second to a second number of frames per second; and motion-transmitting means connecting said manually operable means to said moving member of said automatic means for turning said moving member when said manually operable means is actuated to change the number of frames exposed per second from said given number to said second number for changing the adjustment of the diaphragm means to one where the exposure aperture will properly expose the film during exposure thereof at said second number of frames per second.

References Cited by the Examiner

UNITED STATES PATENTS

| 1,897,762 | 2/1933 | Morsbach | 352—141 |
| 2,186,611 | 1/1940 | Martin | 352—141 X |
| 3,128,669 | 4/1964 | Steisslinger | 352—141 |
| 3,177,497 | 4/1965 | Richantz | 352—141 |

FOREIGN PATENTS 913,815  12/1962  Great Britain.

NORTON ANSHER, *Primary Examiner.*

WILLIAM MISIEK, *Examiner.*